(12) United States Patent
Mizutani

(10) Patent No.: US 7,095,982 B2
(45) Date of Patent: Aug. 22, 2006

(54) COMMUNICATION APPARATUS FOR COMMUNICATION WITH COMMUNICATION NETWORK, IMAGE PICKUP APPARATUS FOR INTER-APPARATUS COMMUNICATION, AND COMMUNICATION APPARATUS FOR COMMUNICATION WITH THE SAME IMAGE PICKUP APPARATUS

(75) Inventor: Koichi Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 09/956,092

(22) Filed: Sep. 20, 2001

(65) Prior Publication Data

US 2002/0037711 A1    Mar. 28, 2002

(30) Foreign Application Priority Data

Sep. 25, 2000  (JP)  ............................. 2000-291159

(51) Int. Cl.
  *H04B 7/00*  (2006.01)
(52) U.S. Cl. ................ 455/41.2; 455/556.1; 348/14.02
(58) Field of Classification Search .................. 455/41, 455/414.1, 556.1, 556.2, 574; 348/14.01, 348/14.02, 14.12, 372
See application file for complete search history.

(56) References Cited

U.S. PATENT DOCUMENTS

| 5,034,948 A | 7/1991 | Mizutani et al. ............... 370/79 |
| 5,790,957 A | 8/1998 | Heidari ........................ 455/553 |

FOREIGN PATENT DOCUMENTS

| DE | 19935232 A1 | * | 2/2000 |
| JP | 08-009239 | * | 6/1994 |
| JP | 8-79160 | | 3/1996 |
| JP | 08-163370 | * | 6/1996 |
| JP | 8-195871 | | 7/1996 |
| JP | 9-130863 | | 5/1997 |
| JP | 410304445 A | * | 11/1998 |
| JP | 11-8823 | | 1/1999 |

* cited by examiner

*Primary Examiner*—Melur Ramakrishnaiah
(74) *Attorney, Agent, or Firm*—Fitzpatrick, Cella, Harper & Scinto

(57) ABSTRACT

A communication apparatus measures a received signal strength indicator of a communication network and transmits the measured received signal strength indicator to an image pickup apparatus. The image pickup apparatus transmits, to the communication apparatus, any one of a thumbnail of selected image data, data obtained by compressing the selected image data, and the selected image data in a raw state in accordance with the received signal strength indicator of the received data of the communication network. The communication apparatus transfers the received image data for transfer to the communication network.

15 Claims, 9 Drawing Sheets

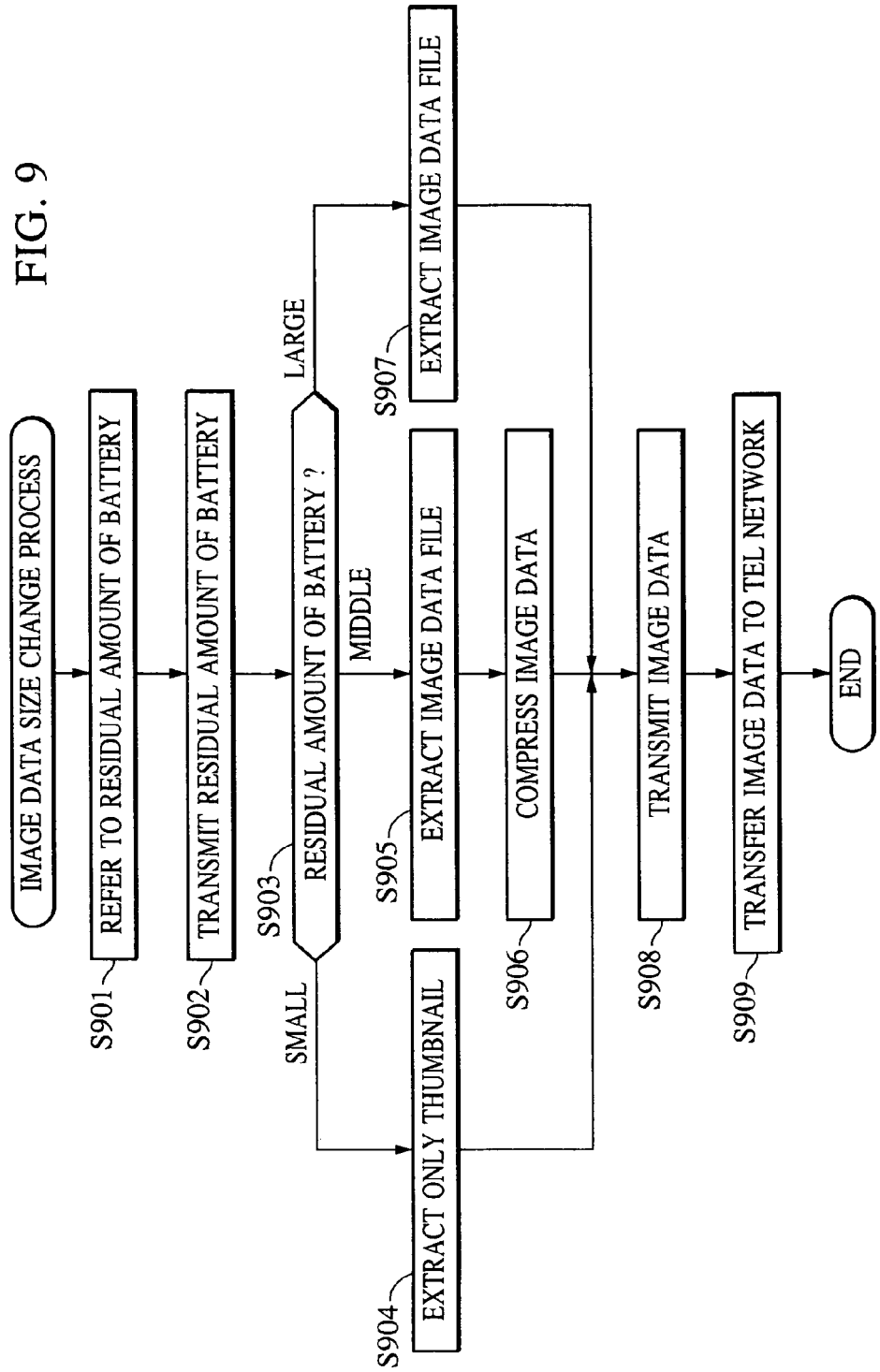

COMMUNICATION APPARATUS FOR COMMUNICATION WITH COMMUNICATION NETWORK, IMAGE PICKUP APPARATUS FOR INTER-APPARATUS COMMUNICATION, AND COMMUNICATION APPARATUS FOR COMMUNICATION WITH THE SAME IMAGE PICKUP APPARATUS

BACKGROUND OF THE INVENTION

1. Field of the Invention

The present invention relates to a communication apparatus for communication with a communication network, an image pickup apparatus for inter-apparatus communication, a communication apparatus for communication with the image pickup apparatus, a control method therefor, and a storage medium for storing a control program.

2. Description of the Related Art

Recently, due to the progress of semiconductor technology, etc., portable radio communication apparatuses have become widespread. Communication using cellular phones as portable radio communication apparatuses is shifting from calls made to a person to calls made to a number.

In addition to voice communication, the portable radio communication apparatuses implement a text mail function and an easy Web browser function. To further improve the communication capacity of new-generation portable radio communication apparatuses, it is considered that an improvement in the capacity of an image photographing function and a communication function of the photographed image will become important.

Conventionally, after digitizing an image photographed by a camera, the digitized image is transferred to a telephone network by the portable radio communication apparatus. Recently, the communication speed of portable radio communication apparatuses and the picture quality of digital cameras of portable radio communication apparatuses have been improved in practice. In particular, the digital cameras have greatly improved picture quality and, for example, if printing a large-sized image, the digital camera photographs an image with a high picture quality which is substantially similar to that of a camera using a silver-halide film (film-based camera).

An image communication method in which the portable radio communication apparatus transfers an image of an object to a telephone network after digitizing it into image data, using a scanner, etc., and the transferred image is obtained by photographing the object using a camera, developing the image in a mini laboratory, etc., and printing the image, requires time and a number of operations. Accordingly, an image communication method for transferring, using the portable radio communication apparatus, digitized image data which is obtained by photographing the object with a digital camera is very efficient.

The above-mentioned image communication method using the digital camera and the portable radio communication apparatus responds to the trends of today's world such as various communication and multimedia demands.

However, the above image communication method using the digital camera and the portable radio communication apparatus has the following problems.

(1) If the line quality of the telephone network degrades when transferring the image data to the telephone network, that is, reception errors occurs, the number of re-transfers of the image data is increased, and it takes a long time for communication of the image data. In particular, when transferring a large amount of image data which requires a long time for communication, the image communication needs a much longer time. Consequently, there is a problem in that a specific radio frequency or a specific channel is exclusively used for a long time (in other words, is necessarily used) and power (battery) consumption is increased.

(2) If a large amount of image data is transferred when the data-transfer capacity of the telephone network is small (i.e., a low data-transfer speed), the image communication needs a much longer period of time. Consequently, there is a problem in that a specific radio frequency or a specific channel is exclusively used for a long time (in other words, is necessarily used) and power (battery) consumption is increased.

(3) If transferring a large amount of image data causes a radio unit to operate for a long time in a status in which the amount of remaining battery power in the portable radio communication apparatus is low, there is a problem in that the load on the battery is increased, thus further degrading the battery, and a decrease in voltage of the circuit causes an erroneous operation of the circuit and, then, the communication is disconnected.

SUMMARY OF THE INVENTION

It is one object of the present invention to enable a high quality image to be transmitted from an image pickup apparatus to a communication apparatus in accordance with the status of the communication apparatus.

Also, it is another object of the present invention to prevent long-term exclusive use (necessary use) of a specific frequency or a specific channel and increase in power (battery) consumption even if the line quality of a communication network is low or a data transfer capacity is small when an image from an image pickup apparatus is transmitted through a communication apparatus.

It is another object of the present invention to prevent rapid deterioration in power (battery level) and an erroneous operation of a circuit due to the decrease in voltage of the circuit even in a state in which there is a small amount of remaining battery power in a communication apparatus when an image from an image pickup apparatus is transmitted through the communication apparatus.

As mentioned above, it is further another object of the present invention to perform proper communication in accordance with the predetermined status of the communication apparatus.

Further objects, features and advantages of the present invention will become apparent from the following description of the preferred embodiments with reference to the attached drawings.

BRIEF DESCRIPTION OF THE DRAWINGS

FIG. 9 is a flowchart for an image-data-size changing process which is executed by an image pickup apparatus and a communication apparatus according to a fourth embodiment of the present invention.

DESCRIPTION OF THE PREFERRED EMBODIMENTS

Hereinbelow, a detailed description is given of an image pickup apparatus and a communication apparatus according to a first embodiment of the present invention.

Figure 1:
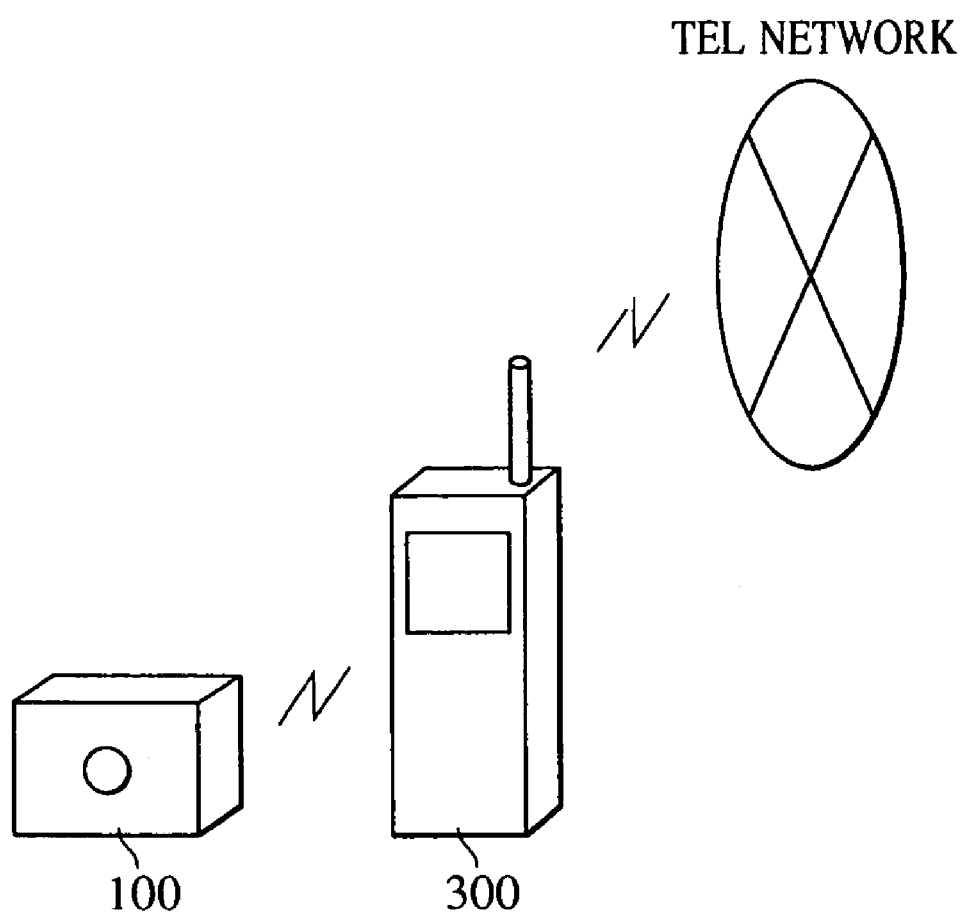
FIG. 1 is a diagram of the entire structure of an image pickup apparatus and a communication apparatus according to a first embodiment of the present invention.

FIG. 1 is a diagram showing the overall structure of an image pickup apparatus 100 and a communication apparatus 300 according to the first embodiment of the present invention.

Referring to FIG. 1, the image pickup apparatus 100 and the communication apparatus 300 can mutually receive and transmit data including commands and photographed images via inter-apparatus communication of a spread spectrum radio system based on the Bluetooth standard (hereinafter, referred to "Bluetooth inter-apparatus communication"). The communication apparatus 300 can also communicate with a telephone network by radio.

Figure 2:
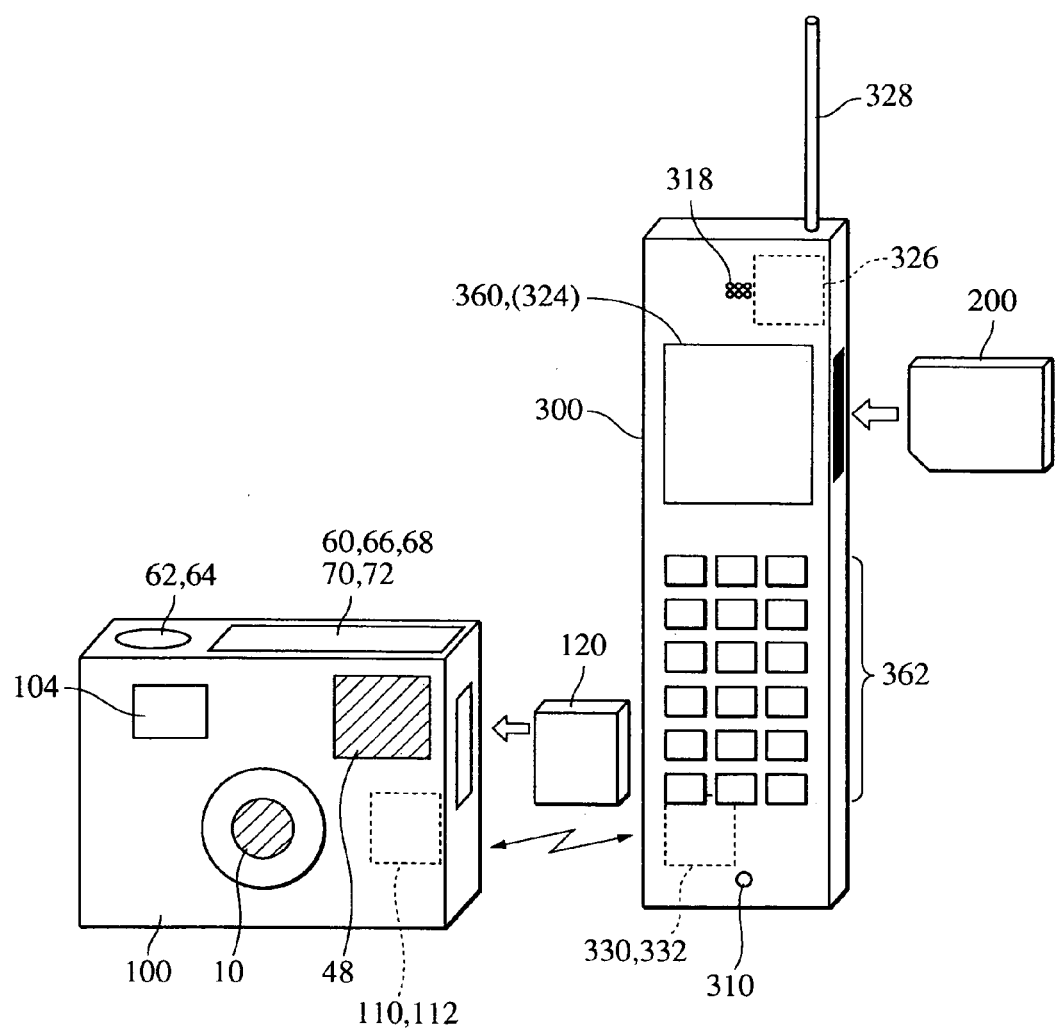
FIG. 2 is a diagram of the external appearance of the image pickup apparatus and the communication apparatus in FIG. 1.

FIG. 2 is a diagram of the external appearance of the image pickup apparatus 100 and the communication apparatus 300 in FIG. 1.

Referring to FIG. 2, the image pickup apparatus 100 comprises a flash 48, a mode dial 60, shutter switches 62 and 64, a single-shot/continuous-shots switch 66, a compression mode switch 68, an operating unit 70, a main switch 72, an optical finder 104, communication means 110, an antenna 112, a photographing lens 10, and the like in respective casings thereof. The communication apparatus 300 comprises a microphone 310, a speaker 318, communication means 326, an antenna 328, communication means 330, an antenna 332, display means 360, operating means 362, and the like in respective casings thereof. The image pickup apparatus 100 further has a slot for inserting therein a storage medium 120. The communication apparatus 300 also has a slot for inserting therein detachable storage means 200.

Figure 3:
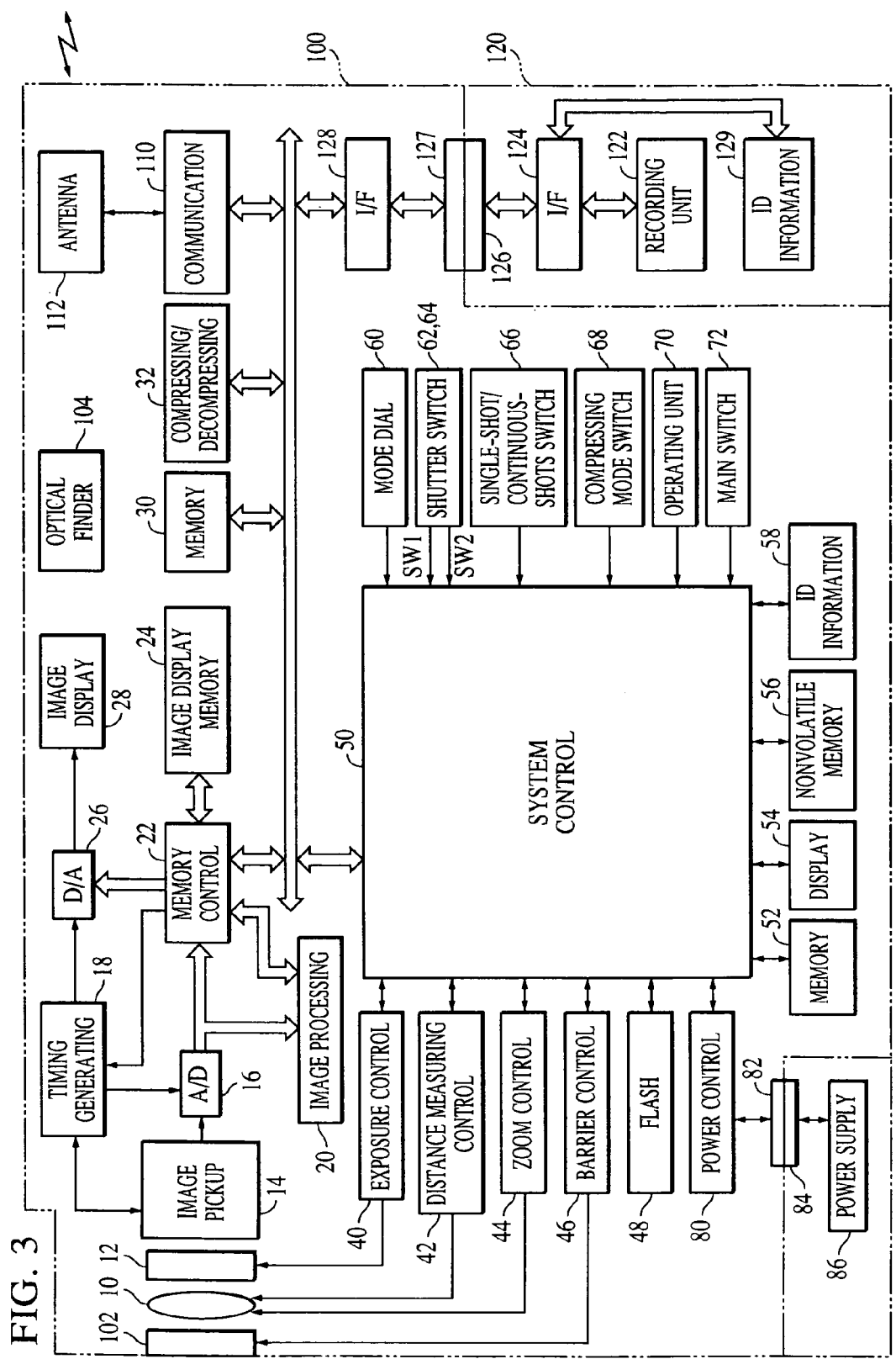
FIG. 3 is a block diagram showing the detailed structure of the image pickup apparatus in FIG. 1.

FIG. 3 is a block diagram showing the detailed structure of the image pickup apparatus 100 in FIG. 3.

Referring to FIG. 3, the image pickup apparatus 100 comprises protecting means 102, the photographing lens 10, a shutter 12, an image pickup element 14, an A/D converter 16, a timing generating circuit 18, an image processing circuit 20, a memory control circuit 22, an image display memory 24, a D/A converter 26, image display means 28, a memory 30, a compressing/decompressing circuit 32, the optical finder 104, the communication means 110, the antenna 112, a system control circuit 50, exposure control means 40, distance measuring control means 42, zoom control means 44, barrier control means 46, the flash 48, power control means 80, connectors 82 and 84, a power supply 86, a memory 52, display means 54, a nonvolatile memory 56, identifying (ID) information 58, the mode dial 60, the shutter switches 62 and 64, the single-shot/continuous-shots switch 66, the compressing mode switch 68, the operating unit 70, and the main switch 72.

The above-mentioned structure will be described in detail. The photographing lens 10 captures an optical image of an object.

The shutter 12 has a stop function. The image pickup element 14 converts an optical image captured through the photographing lens 10 into an electrical signal. The A/D converter 16 converts an analog signal output from the image pickup element 14 into a digital signal. The timing generating circuit 18 supplies a clock signal and a control signal to the image pickup element 14, the A/D converter 16, and the D/A converter 26, and is controlled by the memory control circuit 22 and the system control circuit 50.

The image processing circuit 20 performs predetermined image interpolation and color conversion on the data from the A/D converter 16 or on the data from the memory control circuit 22.

The image processing circuit 20 performs a predetermined calculation by using the photographed image data and, based on the obtained calculated result, the system control circuit 50 controls the exposure control means 40 and the distance measuring control means 42 through an AF (automatic focusing) process based on a TTL (through the lens) system, an AE (automatic exposing) process, and an EF (pre-Exposure Flash) process.

Further, the image processing circuit 20 performs a predetermined calculation by using the photographed image data and, based on the obtained calculated result, also performs an AWB (automatic white balancing) process based on the TTL system.

The memory control circuit 22 controls the A/D converter 16, the timing generating circuit 18, the image processing circuit 20, the image display memory 24, the D/A converter 26, the memory 30, and the compressing/decompressing circuit 32. The data from the A/D converter 16 is written to the image display memory 24 or the memory 30 via the image processing circuit 20 and the memory control circuit 22 or directly via the memory control circuit 22.

The image display means 28 comprises a TFT-LCD (Thin-Film-Transistor-type Liquid Crystal Display), etc. The image data for display, written to the image display memory 24, is displayed on the image display means 28 via the D/A converter 26.

By sequentially displaying the photographed image data on the image display means 28, an electronic finder function can be realized. The image display means 28 can be arbitrarily turned on/off for display in accordance with an instruction from the system control circuit 50. If the image display means 28 is turned off, power consumption of the image pickup device 100 can be greatly reduced.

The memory 30 comprises a volatile memory or/and a non-volatile memory for storing a still image or a moving image which is photographed, with a sufficient memory capacity for storing still images corresponding to a predetermined number of pictures or a moving image for a predetermined period of time.

Thus, when continuous photographing of a plurality of still images and panorama photographing, images requiring a large capacity can be written to the memory 30 at high speed.

The memory 30 can also be used as a working area of the system control circuit 50.

The compressing/decompressing circuit 32 reads the image data stored in the memory 30, compresses or decompresses the read data through an adaptive discrete cosine transform (ADCT), etc., and writes the processed image data to the memory 30.

The exposure control means 40 controls the shutter 12 having a stop function, and has a flash control function in combination with the flash 48. The distance measuring control means 42 controls a focusing operation of the photographing lens 10. The zoom control means 44 controls a zooming operation of the photographing lens 10. The barrier control means 46 controls an operation of the protecting means 102 as a barrier. The flash 48 has a floodlighting function of AF auxiliary light and a flash control function. The exposure control means 40 and the distance measuring control means 42 are controlled based on the TTL system and, based on the calculated result obtained by calculating the photographed image data by the image processing circuit 20, the system control circuit 50 controls the exposure control means 40 and the distance measuring control means 42.

The system control circuit 50 controls the overall image pickup apparatus 100. The memory 52 stores constants, variables, programs, and the like for the operation of the system control circuit 50. The display means 54 comprises a single or a plurality of LCD devices or speakers for outputting an operating mode and a message, etc. by using characters, images, sounds, and the like in accordance with the execution of the program in the system control circuit 50, at an easily viewed position near the operating unit of the image pickup apparatus 100, and is formed by combining an LCD or an LED, and a sound generating element, etc. A function of the display means 54 is partly provided in the optical finder 104.

Display contents on the LCD, etc. of the display means 54 indicate single-shot or continuous-shots photographing, a self timer, the compression ratio, the number of recording pixels, the number of sheets of photographs taken, the remaining number of photographed pictures, the shutter speed, the stop value, exposure correction, flash, the level of a red-eye reduction effect, macro-photographing, the buzzer setting, the remaining amount of battery indicating by the timer, the remaining amount of battery for the overall apparatus, errors, information indicated by order of magnitude, that the detachable storage medium 200 is detached, communication I/F operation, date and time, and the like. Display contents in the optical finder 104 of the display means 54 indicate the focusing state, a warning against camera movement, charging of the flash, the shutter speed, the stop value, exposure correction, and the like.

The nonvolatile memory 56 is an electrically erasable and recordable memory and comprises, for example, an EEPROM. The ID information 58 is various ID information for identification prior to communication with the communication apparatus 300 via the communication means 110 and the antenna 112. Operating means for inputting various operations to the system control circuit 50 corresponds to the mode dial 60, the shutter switches 62 and 64, the single-shot/continuous-shots switch 66, the compression mode switch 68, the operating unit 70, and the main switch 72, and is formed by using switches, dials, touch panels, pointing devices based on detection using eye-viewing, voice recognition devices, or the like, or by a combination thereof. Herein, the operating means is specifically described.

The main switch 72 can switch on/off the power. The mode dial 60 can switch functional modes such as an automatic photographing mode, a photographing mode, a panorama photographing mode, a replay mode, a multi-screen replay and erasing mode, and a PC (personal computer) connecting mode.

A shutter switch 62 instructs the start of operations such as the AF (automatic focusing) process, the AE (automatic exposure) process, the AWB (automatic white balancing) process, and the EF (pre-exposure flash) process.

A shutter switch 64 is switched on upon completing an operation of a shutter button (not shown), and instructs the start of a series of processes such as an exposure process for transmitting a signal read from the image pickup element 14 to the A/D converter 16 and the memory control circuit 22 and for writing the image data to the memory 30, a developing process using the calculation in the image processing circuit 20 and the memory control circuit 22, the process for reading the image data from the memory 30, the compressing process by the compressing/decompressing circuit 32, and the recording process for writing the image data to the detachable storage medium 200.

The single-shot/continuous-shots switch 66 can set a single-shot mode and a continuous-shot mode. In the case of the single-shot mode, the shutter switch 64 is pressed, one frame is photographed, and the image pickup apparatus enters a standby mode. In the case of the continuous-shots mode, the object is continuously photographed while the shutter switch 64 is pressed.

The compression mode switch 68 can select a mode for selecting the JPEG (Joint Photographic Experts Group) compression ratio and a CCDRAW mode for digitizing a signal from the image pickup element 14 in a raw state and recording the digital signal in the recording medium.

The operating unit 70 is formed of various buttons and a touch panel, and comprises a menu button, a setting button, a macro button, a multi-screen playback new page button, a flash setting button, a self timer button, a menu-shift (+) (plus) button, a menu-shift (−) (minus) button, a playback image shift (+) (plus) button, a playback image shift (−) (minus) button, a photographing quality selecting button, an exposure correction button, a date and time setting button, a playback switch for setting function modes such as a playback mode, negative-screen replay/erasing mode, a PC connecting mode, an AF mode setting switch for setting a one-shot AF mode for starting the automatic focusing operation after pressing the shutter switch SW1 in the shutter 62 and, if focused, keeping the focusing state and an AF mode setting switch for setting a servo AF mode for continuing the automatic focusing operation during pressing the shutter switch SW1 in the shutter switch 62, an image display ON/OFF switch for turning on/off the image display means 28, a quick review ON/OFF switch for setting a quick review function to automatically replay the image data photographed just after photographing. Incidentally, the functions of the plus buttons and the minus buttons, as rotary dials, enable numerals and functions to be quickly selected.

The power control means 80 comprises a battery detecting circuit, a DC—DC converter, a switch circuit for switching an energized block, and the like, and detects whether or not the battery is installed, the type of battery, and the remaining battery level, controls the DC—DC converter based on the detected result and instructions from the system control circuit 50, and supplies a necessary voltage to components, including the recording medium, for a necessary period of time. The power supply 86 is composed of a primary battery such as an alkaline battery or a lithium battery, a secondary battery such as an NiCd battery, an NiMH battery, or an Li-ion battery, or an AC adapter.

The protecting means 102 corresponds to a barrier for preventing dirt from entering and for preventing damage to an image pickup unit including the photographing lens 10 in the image pickup apparatus 100 by covering the image pickup unit. The use of only the optical finder 104 enables photographing without the electronic finder function in the image display means 28. In the optical finder 104, part of the functions of the display means 54 is provided, for instance, focusing, warning against camera movement, the charging of the flash, the shutter speed, the stop value, and exposure correction.

The communication means 110 has a short-distance fast data communication function for Bluetooth inter-apparatus communication. The image pickup apparatus 100 is connected via the antenna 112 to another equipment by using the communication means 110.

The interface 128 functions as an interface to a storage medium such as a memory card or a hard disk.

The connector 127 connects the storage medium such as the memory card or the hard disk. Although the interface and the connector for connecting the storage medium is one system in the present embodiment, they may be a plurality of systems.

Different-standard interfaces and connectors may be combined.

The interface and the connector may conform to standards such as a PCMCIA (Persona Computer Memory Card International Association) card, a CF (Compact Flash) card, an MMC (multi-media) card, etc.

Furthermore, if the interface 128 and the connector 127 conform to the standards of the PCMCIA card or the CF card, by connecting various communication cards such as a LAN card, a modem card, a USB card, an IEEE 1394 card, a P1284 card, an SCSI card, or a PiHS communication card, the image data and management information associated with the image data can be transferred to another computer or peripheral equipment such as a printer.

The storage medium 120 is composed of the memory card, the hard disk, or the like.

The storage medium 120 comprises a recording unit 122 composed of a semiconductor memory or a magnetic disk, an interface 124 to the image pickup apparatus 100, a connector 126 for connecting the image pickup apparatus 100, and identification (ID) information 129.

Figure 4:
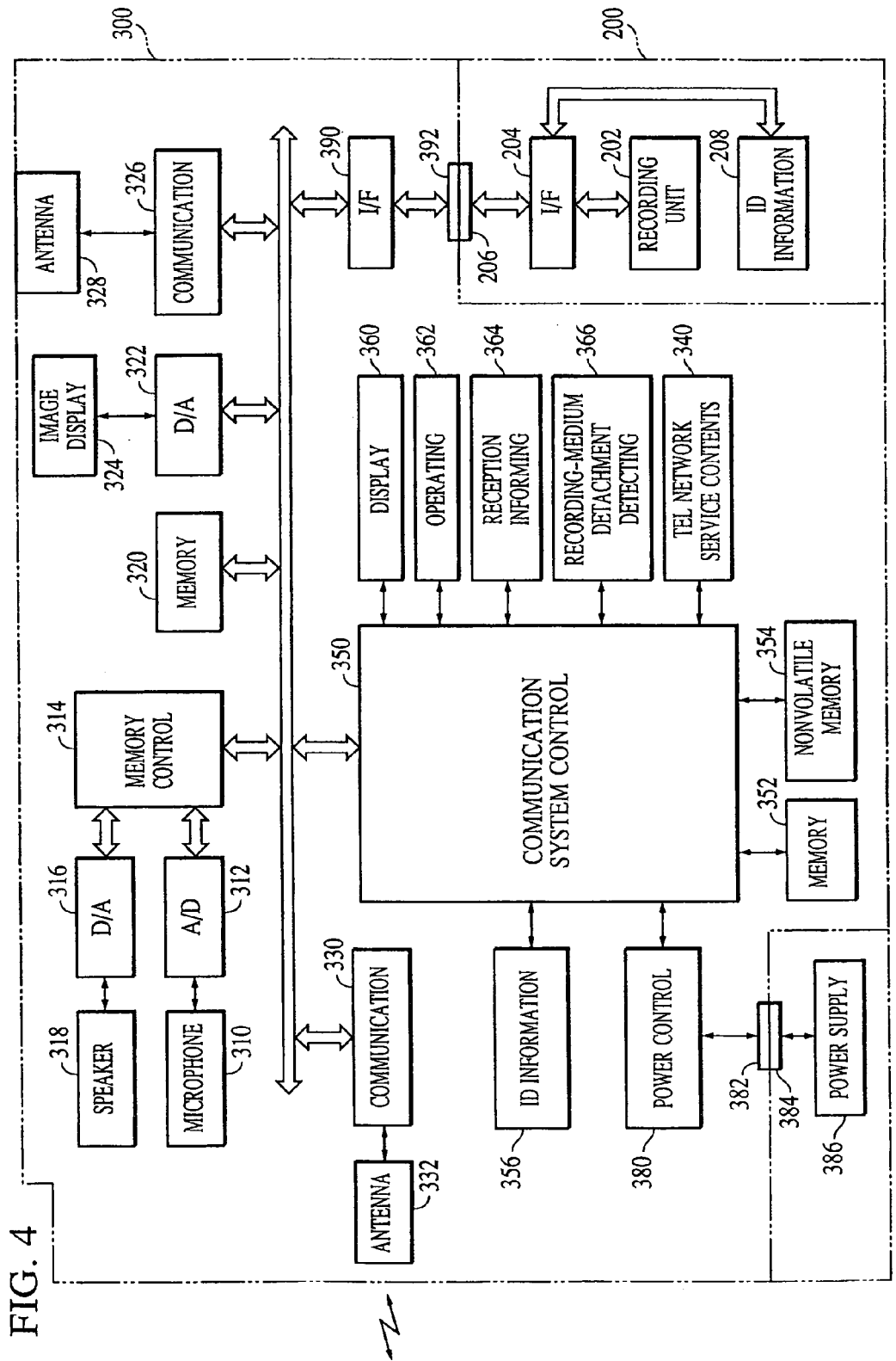
FIG. 4 is a block diagram showing the detailed structure of the communication apparatus in FIG. 1.

FIG. 4 is a block diagram showing the detailed structure of the communication apparatus 300 in FIG. 1.

Referring to FIG. 4, the communication apparatus 300 comprises a microphone 310, a speaker 318, an A/D converter 312, a D/A converter 316, a memory control circuit 314, a memory 320, a D/A converter 322, image display means 324, an antenna 328, communication means 326, an interface 390, a connector 392, an antenna 332, communication means 330, a network property storing unit 340, a communication system control circuit 350, identification (ID) information 356, power control means 380, connectors 382 and 384, a power supply 386, a memory 352, a nonvolatile memory 354, display means 360, operating means 362, reception informing means 364, and recording medium detachment detecting means 366.

The microphone 310 converts sound into an electrical signal. The A/D converter 312 converts an analog output signal from the microphone 310 into a digital signal. The memory control circuit 314 writes/reads the output data from the A/D converter 312 to/from the memory 320, and controls an operation for inputting the read data from the memory 320 to the D/A converter 316. The D/A converter 316 converts the digital signal into an analog signal. The speaker 318 converts the electrical signal into an audio signal. The memory 320 stores a sound input via the microphone 310 and a still image or a moving image which is transmitted by the image pickup apparatus 100, and has a sufficient memory capacity for storing the sound for a predetermined period of time and a predetermined number of pictures of the still image or the moving image for a predetermined period of time. The D/A converter 322 converts the still image data or the moving image data stored in the memory 320 into an analog signal. The image display means 324 displays an output image signal from the D/A converter 322.

The communication means 326 has various long-distance radio communication functions such as TDMA (Time Division Multiple Access), CDMA (Code Division Multiple Access), and W-CDMA (Wide-band Code Division Multiple Access). The communication apparatus 300 is connected to another equipment or a communication base station via the antenna 328 by using the communication means 326.

Figure 5:
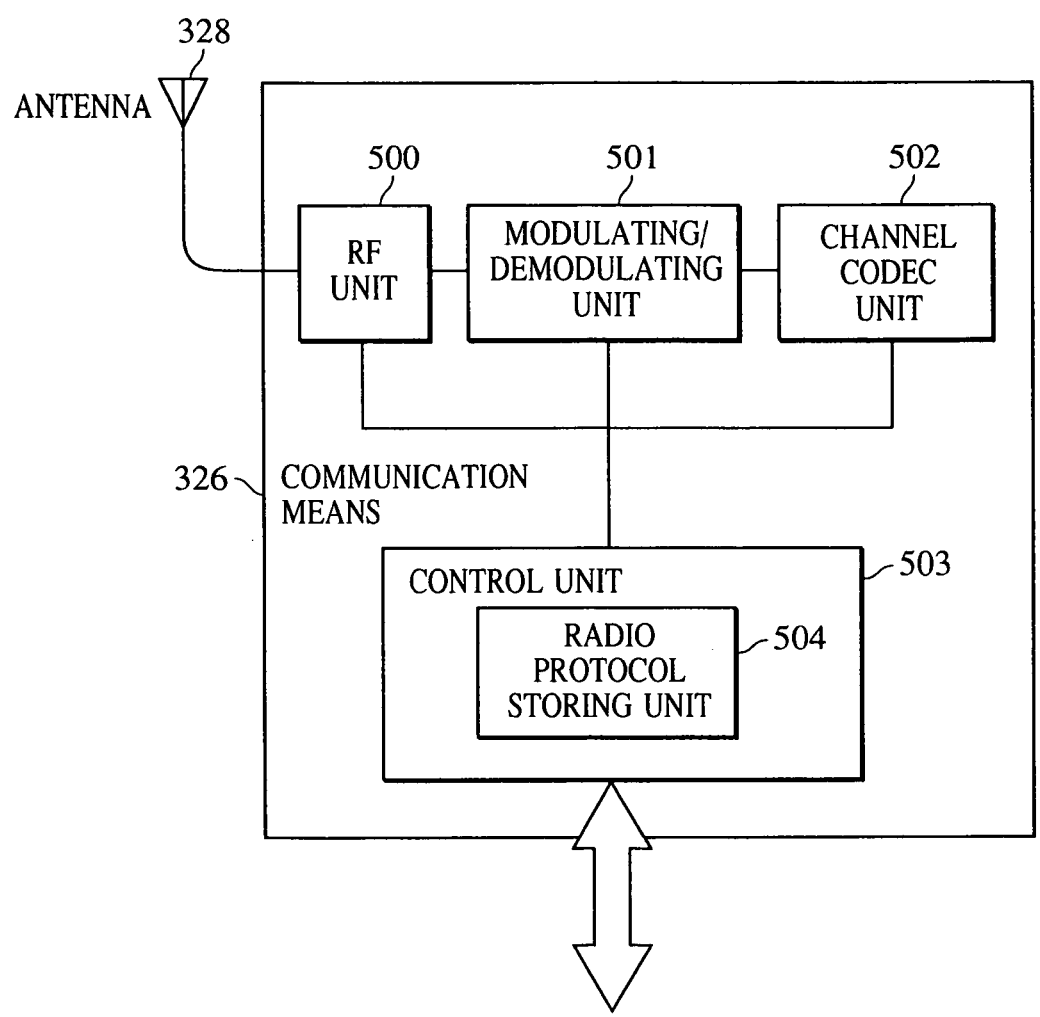
FIG. 5 is a block diagram showing the detailed structure of communication means in FIG. 4.

FIG. 5 is a block diagram showing the detailed structure of the communication means 326 in FIG. 4.

Referring to FIG. 5, the communication means 326 comprises an RF unit 500 for receiving and transmitting reception data and transmission data to a telephone network via the antenna 328; a modulating/demodulating unit 501 for modulating the transmission data and demodulating the reception data; a channel CODEC unit 502 for a TDMA process for indicating disassembly/assembly of a frame, for an error detecting process, for a scrambling process, and for a data privacy process; and a control unit 503 for controlling the RF unit 500 to the channel CODEC unit 502. Further, the control unit 503 has a radio protocol storing unit 504 for executing a communication protocol process from layer 1 to layer 3 of GSM (Global System for Mobile Communication) in accordance with a prescribed routine.

The RF unit 500 detects and outputs a received signal strength indicator (RSSI). The channel CODEC unit 502 detects an error of the reception data, counts the number of errors per unit time, and outputs the counted number as an error rate value.

Referring back to FIG. 4, the communication means 330 has a short-distance fast data communication function for the Bluetooth inter-apparatus communication. The communication apparatus 300 is connected to another equipment via the antenna 332 by using the communication means 330.

The communication system control circuit 350 controls the overall communication apparatus 300. The memory 352 stores constants, variables, programs, and the like for an operation of the communication system control circuit 350. The nonvolatile memory 354 is an electrically erasable memory, and is composed of an EEPROM, etc. The ID information 356 is various ID information for identification prior to communication with the image pickup apparatus 100 via the communication means 330 and the antenna 332. The display means 360 comprises a single or a plurality of LCD devices or speakers for outputting the operating mode and messages, etc. by using characters, images, sound, and the like in accordance with the execution of the program in the communication system control circuit 350, at an easily viewed position near the operating means of the communication apparatus 300, and is formed by combining an LCD or an LED, a sound generating element, etc.

The operating means 362 for inputting indications of various operations from the communication system control circuit 350 is formed by a single or a plurality of switches, dials, touch panels, pointing devices based on detection using eye-viewing, voice recognition devices, and the like.

The operating means 362 can turn on/off the communication apparatus 300, connect/disconnect communication, input a telephone number, search for a telephone number, switch the communication mode, and the like. If a call is received from another communication apparatus or a communication base station, the reception informing means 364 can inform a user of the communication apparatus 300 of the reception by sound such as a beep sound, a voice, and a music sound, by an image such as an icon, a moving image, a still image, and a light emission image, by vibration, or the like. The recording medium detachment detecting means 366 detects whether or not the detachable storage medium 200 is attached to the connector 392.

The power control means 380 comprises a battery detecting circuit, a DC—DC converter, a switch circuit for switching an energized block, and the like, and detects whether or no the battery is installed, the type of battery, the remaining battery level, controls the DC—DC converter based on the detected result and instructions from the communication system control circuit 350, and supplies a necessary voltage to components, including the recording medium, for a necessary period of time. The power supply 386 is composed of a primary battery such as an alkaline battery or a lithium battery, a secondary battery such as a NiCd battery, a NiMH battery, or a Li-ion battery, or an AC adapter. The connector 392 connects the storage medium such as a memory card or a hard disk.

The network property storing unit 340 stores both service contents of a service plan connected to a public communication network (e.g., a data transfer capacity per service plan), which is provided by a communication carrier, and a service plan to which a user of the communication apparatus 300 subscribes.

Although the interface and the connector for connecting the storage medium is one system in the present embodiment, they may consist of a plurality of systems. Different-standard interfaces and connectors may be combined. The interface and the connector may conform to standards such as a PCMCIA (Persona Computer Memory Card International Association) card, a CF (Compact Flash) card, an MMC (multi-media card) card, etc.

Further, if the interface 390 and the connector 392 conform to the standards of the PCMCIA card or the CF card, by connecting various communication cards such as an LAN card, a modem card, a USB card, an IEEE 1394 card, a P1284 card, an SCSI card, a PHS communication card, the image data and management information associated with the image data can be transferred to another computer or peripheral equipment such as a printer.

The detachable storage medium 200 is composed of a memory card, a hard disk, or the like. The detachable storage medium 200 comprises a recording unit 202 composed of a semiconductor memory and a magnetic disk, an interface 204 to the communication apparatus 300, a connector 206 for connecting the communication apparatus 300, and identification (ID) information 208.

As mentioned above, in the image pickup apparatus 100 in FIG. 3, the image data photographed through the photographing lens 10 is stored in the storage medium 120, and is transmitted to the communication apparatus 300 in FIG. 4 via the communication means 110 and the antenna 112. In the communication apparatus 300, the image data received via the antenna 332 and the communication means 330 is recorded in the detachable storage medium 200, and is transmitted to the telephone network via the communication means 326 and the antenna 328.

Hereinbelow, with reference to FIG. 6, a description is given of an image-data-size changing process which is executed by the image pickup apparatus 100 and the communication apparatus 300 according to the first embodiment of the present invention.

Figure 6:
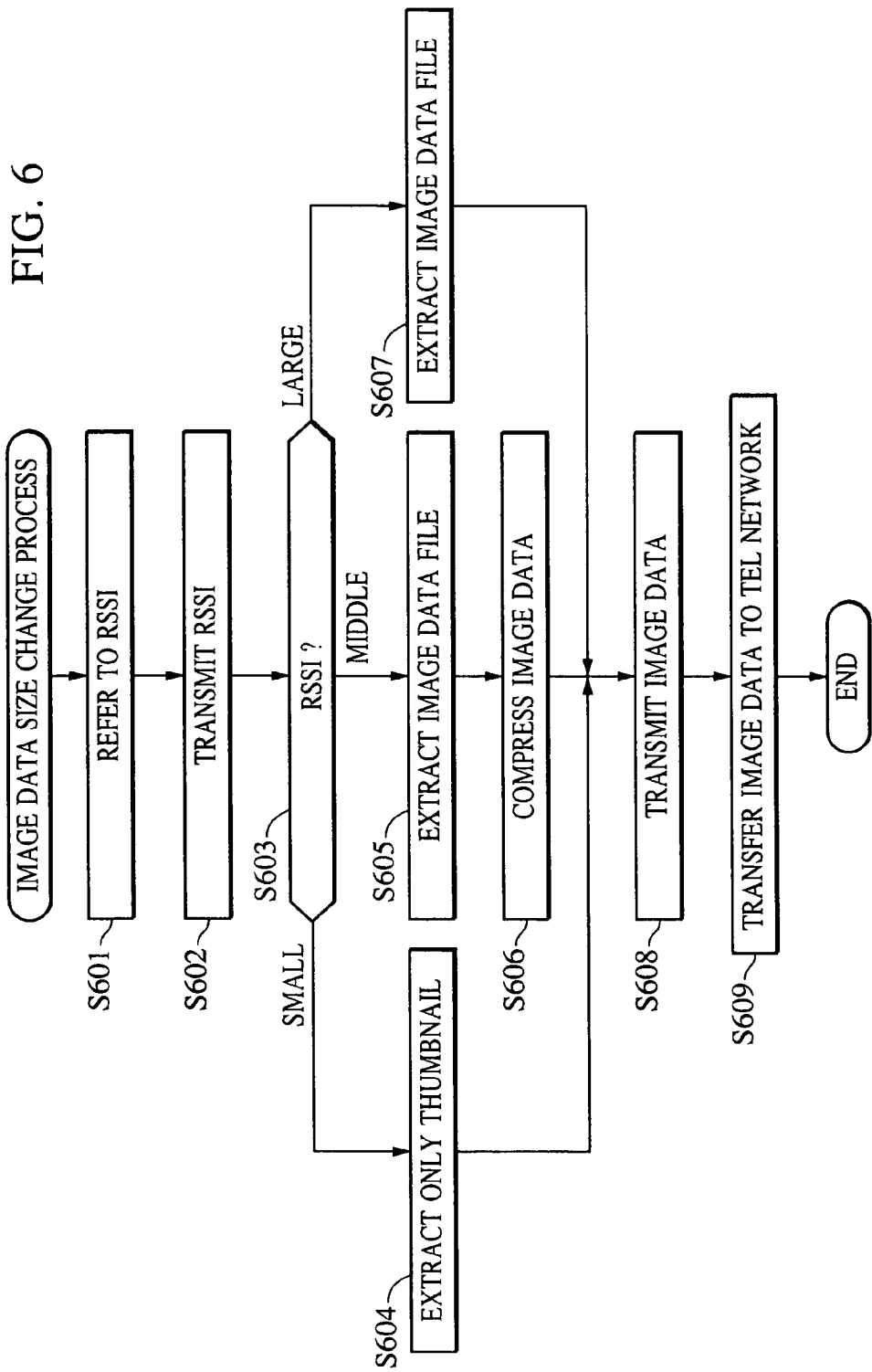
FIG. 6 is a flowchart for an image-data-size changing process which is executed by the image pickup apparatus and the communication apparatus according to the first embodiment of the present invention.

FIG. 6 is a flowchart for the image-data-size changing process which is executed by the image pickup apparatus 100 and the communication apparatus 300 according to the first embodiment of the present invention.

This process is executed when a user selects the image data stored in the memory 30 of the image pickup apparatus 100 by operating the operating means 362 in the communication apparatus 300 and, further, the user's selected image data is transferred to the telephone network by using the communication apparatus 300.

First, the communication system control circuit 350 in the communication apparatus 300 refers to the RSSI of the telephone network via the RF unit 500 in the communication means 326 (step S601), and transmits the value of RSSI to the image pickup apparatus 100 via the communication means 330 and the antenna 332 (step S602).

When the antenna 112 and the communication means 110 in the image pickup apparatus 100 receive the transmitted RSSI, the system control circuit 50 in the image pickup apparatus 100 determines the received RSSI (step S603). Incidentally, the determination of the RSSI is based on comparison with reference values M1 and M2 (M1<M2). Assuming that reference symbol M denotes the RSSI, if M<M1, it is determined that M is small; if $M1 \leq M \leq M2$, it is determined that M is medium; and, if M2<M, it is determined that M is large.

If the determined result of the RSSI (M) is small in step S603, the system control circuit 50 extracts only a reduced image in the head of the JPEG file (hereafter, referred-to as a "thumbnail"), including the selected image data, from the memory 30 in response to the user operating of the communication apparatus 300 (step S604). Further, the system control circuit 50 sets the extracted thumbnail as image data for transfer and, after that, the processing routine advances to step S608.

If the determined result of the RSSI (M) is medium in step S603, the system control circuit 50 extracts the JPEG file in a raw state, including the selected image data, from the memory 30 in response to the user operating of the communication apparatus 300 (step S605). Thereafter, the extracted JPEG file is compressed under the control of the compressing/decompressing circuit 32 by the memory control circuit 22 (step S606). Further, the compressed JPEG file is set as the image data for transfer and, after that, the processing routine advances to step S608.

If the determined result of the RSSI (M) is large in step S603, the system control circuit 50 extracts the JPEG file in a raw state, including the selected image data, from the memory 30 in response to the user operating of the communication apparatus 300 (step S607). Further, the extracted JPEG file is set as the image data for transfer and, after that, the processing routine advances to step S608.

In step S608, the system control circuit 50 transmits the image data for transfer to the communication apparatus 300 via the communication means 110 and the antenna 112. When the antenna 332 and the communication means 330 in the communication apparatus 300 receive the transmitted image data for transfer, the communication system control circuit 350 in the communication apparatus 300 transfers the received image data for transfer to the telephone network via the communication means 326 and the antenna 328 (step S609). Thereafter, this process ends.

In the image-data-size changing process in FIG. 6, since the system control circuit 50 in the image pickup apparatus 100 and the communication system control circuit 350 in the communication apparatus 300 transfer the selected thumbnail of the image data to the telephone network when the RSSI from the telephone network is small, the data size can be reduced. Also, if the line quality of the telephone network is low, it is possible to prevent a specific radio frequency or a specific channel from being exclusively used for a long time (in other words, from being necessarily used) and power (battery) consumption from being increased.

If the image size communicated with image pickup apparatus 100 in the case of the RSSI referred in step S601 (e.g., the thumbnail, the image obtained by further compressing the JPEG file, or the JPEG image) is displayed and the user accepts the communication of the displayed image size by operating the operating means 362, the processing routine subsequent to step S702 may be performed. As a result, the image having the size accepted by the user is communicated.

Hereinbelow, a description is given of an image-data-size changing process which is executed by an image pickup apparatus 100 and a communication apparatus 300 according to a second embodiment of the present invention with reference to FIG. 7.

According to the second embodiment of the present invention, the overall structure and the respective structures of the image pickup apparatus 100 and the communication apparatus 300 are substantially similar to those of the image pickup apparatus 100 and the communication apparatus 300 in the first embodiment, and a detailed description of the structures of the image pickup apparatus 100 and the communication apparatus 300 is omitted.

Figure 7:
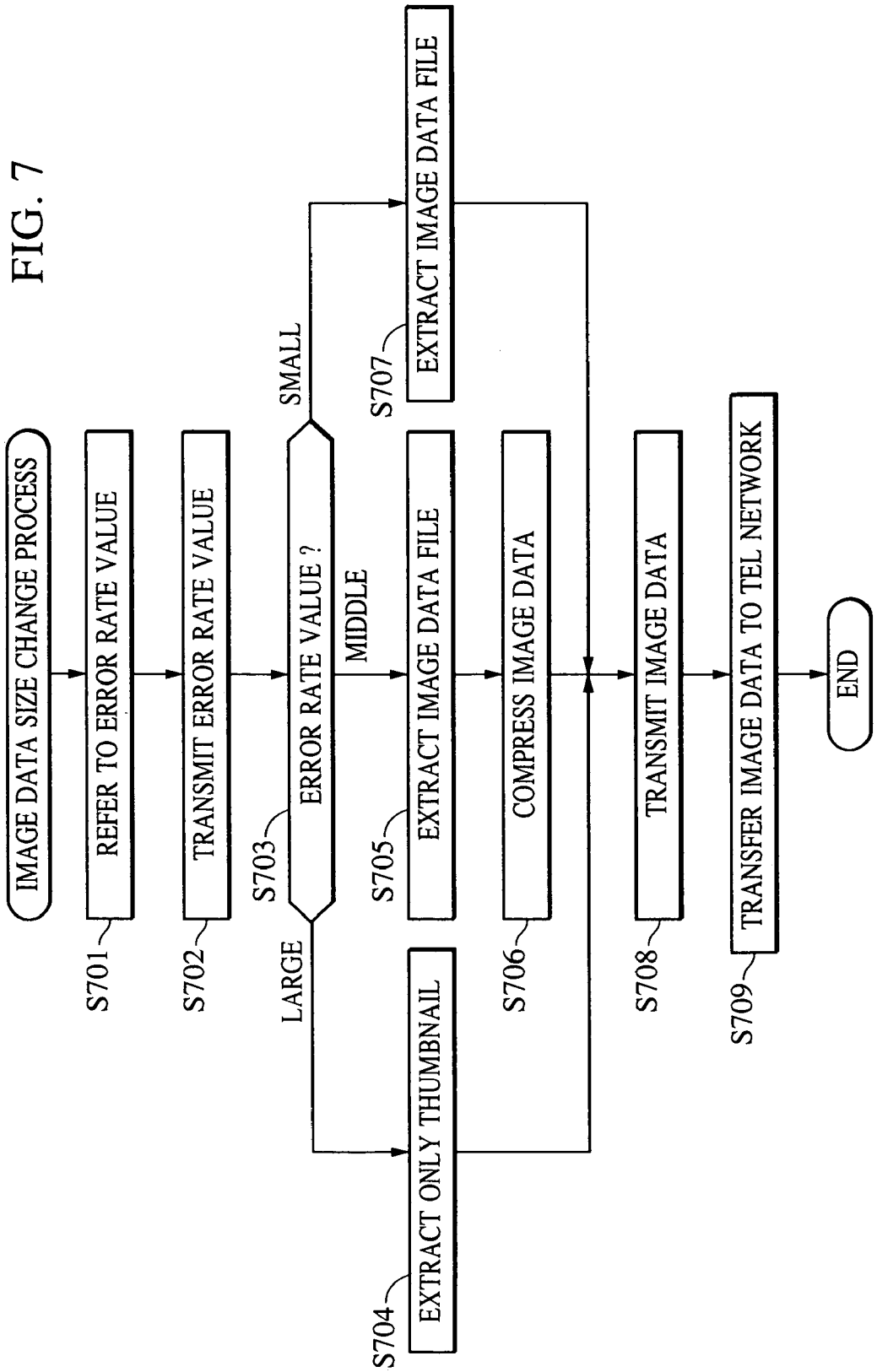
FIG. 7 is a flowchart for an image-data-size changing process which is executed by an image pickup apparatus and a communication apparatus according to a second embodiment of the present invention.

FIG. 7 is a flowchart for the image-data-size changing process which is executed by the image pickup apparatus 100 and the communication apparatus 300 according to the second embodiment of the present invention.

This process is also executed when a user selects the image data stored in the memory 30 of the image pickup apparatus 100 by operating the operating means 362 in the communication apparatus 300 and, further, the user's selected image data is transferred to the telephone network by using the communication apparatus 300.

First, the communication system control circuit 350 in the communication apparatus 300 refers to the error rate value of the reception data from the telephone network via the channel CODEC unit 502 in the communication means 326 (step S701), and transmits the referred error rate value to the image pickup apparatus 100 via the communication means 330 and the antenna 332 (step S702).

When the antenna 112 and the communication means 110 in the image pickup apparatus 100 receive the transmitted error rate value, the system control circuit 50 in the image pickup apparatus 100 determines the received error rate value (step S703). Incidentally, the determination of the error rate value is based on comparison with reference values E1 and E2 (E1<E2). Assuming that reference symbol E denotes the error rate value, if E<E1, it is determined that M is small; if E1≦E≦E2, it is determined that E is medium; and, if E2<E, it is determined that E is large.

If the determined result of the error rate value (E) is large in step S703, the system control circuit 50 extracts only a thumbnail in the head of the JPEG file, including the selected image data, from the memory 30 in response to the user operating of the communication apparatus 300 (step S704). Further, the system control circuit 50 sets the extracted thumbnail as image data for transfer and, after that, the processing routine advances to step S708.

If the determined result of the error rate value (E) is medium in step S703, the system control circuit 50 extracts the JPEG file with a raw state, including the selected image data, from the memory 30 in response to the user operating the communication apparatus 300 (step S705). Thereafter, the extracted JPEG file is compressed under the control of the compressing/decompressing circuit 32 by the memory control circuit 22 (step S706). Further, the compressed JPEG file is set as the image data for transfer and, after that, the processing routine advances to step S708.

If the determined result of the error rate value (E) is small in step S703, the system control circuit 50 extracts the JPEG file with a raw state, including the selected image data, from the memory 30 in response to the user operating the communication apparatus 300 (step S707). Further, the extracted JPEG file is set as the image data for transfer and, after that, the processing routine advances to step S708.

In step S708, the system control circuit 50 transmits the image data for transfer to the communication apparatus 300 via the communication means 110 and the antenna 112. When the antenna 332 and the communication means 330 in the communication apparatus 300 receive the transmitted image data for transfer, the communication system control circuit 350 in the communication apparatus 300 transfers the received image data for transfer to the telephone network via the communication means 326 and the antenna 328 (step S709). Thereafter, this process ends.

In the image-data-size changing process in FIG. 7, since the system control circuit 50 in the image pickup apparatus 100 and the communication system control circuit 350 in the communication apparatus 300 transfer the selected thumbnail of the image data to the telephone network when the error rate value of the reception data from the telephone network is large, the data size can be reduced. Also, if the line quality of the telephone network is low, it is possible to prevent a specific radio frequency or a specific channel from being exclusively used for a long time (in other words, from being necessarily used) and power (battery) consumption from being increased.

If the image size communicated with image pickup apparatus 100 in the case of the error rate value referred in step S701 (e.g., the thumbnail, the image obtained by further compressing the JPEG file, or the JPEG image) is displayed and the user accepts the communication of the displayed image size by operating the operating means 362, the processing routine sequence to step S702 may be performed. As a result, the image having the size accepted by the user is communicated.

Figure 8:
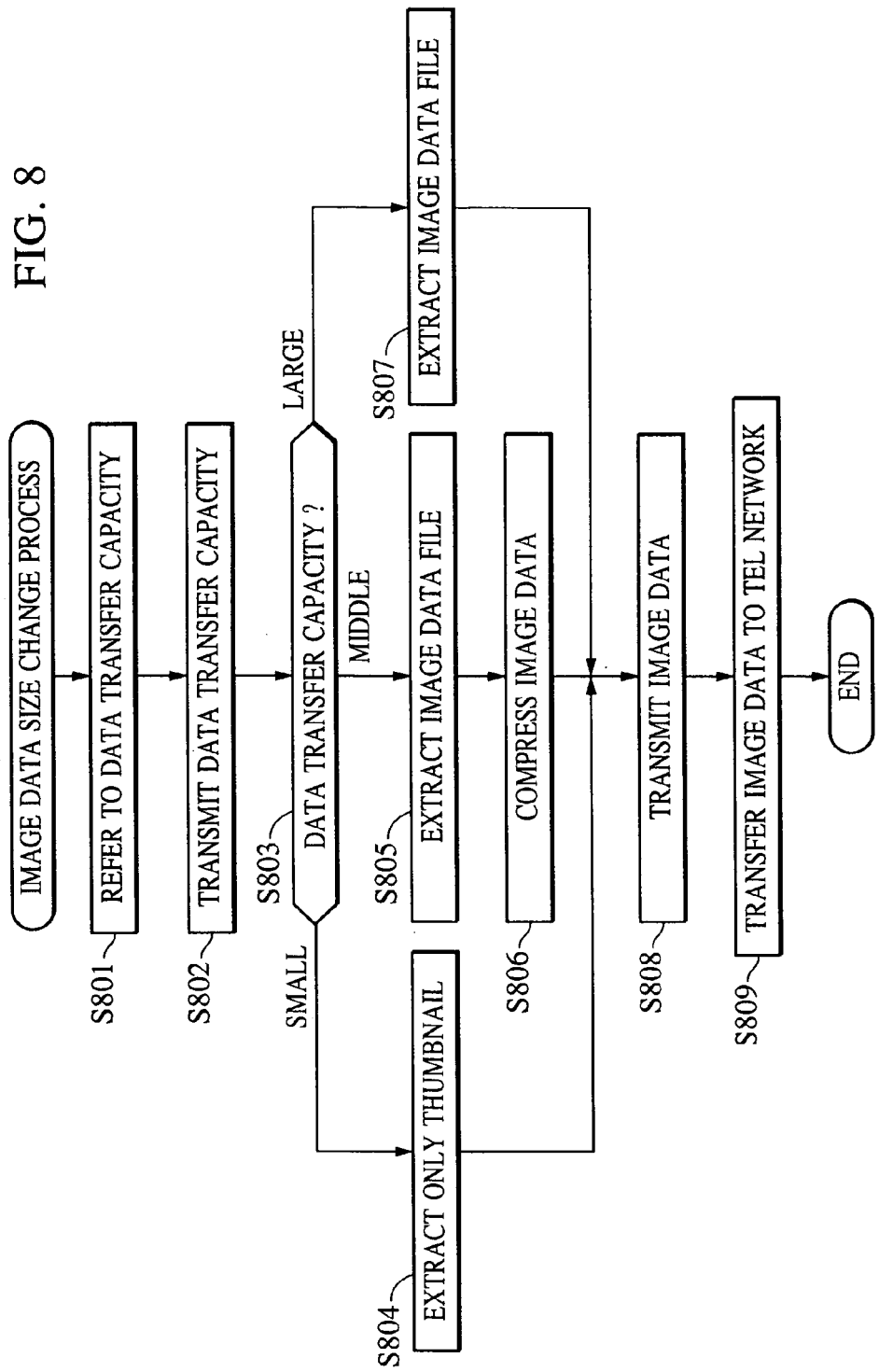
FIG. 8 is a flowchart for an image-data-size changing process which is executed by an image pickup apparatus and a communication apparatus according to a third embodiment of the present invention.

Next, a description is given of an image-data-size changing process which is executed by an image pickup apparatus 100 and a communication apparatus 300 according to a third embodiment of the present invention with reference to FIG. 8.

According to the third embodiment of the present invention, the overall structure and the respective structures of the image pickup apparatus 100 and the communication apparatus 300 are substantially similar to those of the image pickup apparatus 100 and the communication apparatus 300 in the first embodiment, and a detailed description of the structures of the image pickup apparatus 100 and the communication apparatus 300 is omitted.

FIG. 8 is a flowchart for the image-data-size changing process which is executed by the image pickup apparatus 100 and the communication apparatus 300 according to the third embodiment of the present invention.

This process is also executed when a user selects the image data stored in the memory 30 of the image pickup apparatus 100 by operating the operating means 362 in the communication apparatus 300 and, further, the user's selected image data is transferred to the telephone network by using the communication apparatus 300.

First, the communication system control circuit 350 in the communication apparatus 300 refers to the data transfer capacity stored in the network property storing unit 340, of the service plan connected to the telephone network to which the user of the communication apparatus 300 subscribes (step S801), and transmits the referred data transfer capacity to the image pickup apparatus 100 via the communication means 330 and the antenna 332 (step S802).

When the antenna 112 and the communication means 110 in the image pickup apparatus 100 receive the transmitted data transfer capacity, the system control circuit 50 in the image pickup apparatus 100 determines the received data transfer capacity (step S803). Incidentally, the determination of the data transfer capacity is based on comparison with reference values D1 and D2 (D1<D2). Assuming that reference symbol D denotes the data transfer capacity, if D<D1, it is determined that D is small; if D1 ≦D≦D2, it is determined that D is medium; and, if D2<D, it is determined that D is large.

If the determined result of the data transfer capacity (D) is small in step S603, the system control circuit 50 extracts only thumbnail image in the head of the JPEG file, including the selected image data, from the memory 30 in response to the user operating of the communication apparatus 300 (step S804). Further, the system control circuit 50 sets the extracted thumbnail as image data for transfer and, after that, the processing routine advances to step S808.

If the determined result of the data transfer capacity (D) is medium in step S603, the system control circuit 50 extracts the JPEG file in a raw state, including the selected image data, from the memory 30 in response to the user operating of the communication apparatus 300 (step S805). Thereafter, the extracted JPEG file is compressed under the control of the compressing/decompressing circuit 32 by the memory control circuit 22 (step S806). Further, the compressed JPEG file is set as the image data for transfer and, after that, the processing routine advances to step S808.

If the determined result of the data transfer capacity (D) is large in step S803, the system control circuit 50 extracts the JPEG file in a raw state, including the selected image data, from the memory 30 in response to the user operating the communication apparatus 300 (step S807). Further, the extracted JPEG file is set as the image data for transfer and, after that, the processing routine advances to step S808.

In step S808, the system control circuit 50 transmits the image data for transfer to the communication apparatus 300 via the communication means 110 and the antenna 112. When the antenna 332 and the communication means 330 in the communication apparatus 300 receive the transmitted image data for transfer, the communication system control circuit 350 in the communication apparatus 300 transfers the received image data for transfer to the telephone network via the communication means 326 and the antenna 328 (step S809). Thereafter, this process ends.

In the image-data-size changing process in FIG. 8, since the system control circuit 50 in the image pickup apparatus 100 and the communication system control circuit 350 in the communication apparatus 300 transfer the thumbnail of the selected image data to the telephone network when the data transfer capacity of the service plan to which the user of the communication apparatus 300 subscribes is small, the data size can be reduced. It is possible to prevent a specific radio frequency or a specific channel from being exclusively used for a long time (in other words, from being necessarily used) and power (battery) consumption from being increased.

If the image size communicated with image pickup apparatus 100 in the case of the data transfer capacity referred in step S801 (e.g., the thumbnail, the image obtained by further compressing the JPEG file, or the JPEG image) is displayed and the user accepts the communication of the displayed image size by operating the operating means 362, the processing routine sequence to step S802 may be performed. As a result, the image having the size accepted by the user is communicated.

Next, a description is given of an image-data-size changing process which is executed by an image pickup apparatus 100 and a communication apparatus 300 according to a fourth embodiment of the present invention with reference to FIG. 9.

According to the fourth embodiment of the present invention, the overall structure and the respective structures of the image pickup apparatus 100 and the communication apparatus 300 are substantially similar to those of the image pickup apparatus 100 and the communication apparatus 300 in the first embodiment, and a detailed description of the structures of the image pickup apparatus 100 and the communication apparatus 300 is omitted.

FIG. 9 is a flowchart for the image-data-size changing process which is executed by the image pickup apparatus 100 and the communication apparatus 300 according to the fourth embodiment of the present invention.

This process is also executed when a user selects the image data stored in the memory 30 of the image pickup apparatus 100 by operating the operating means 362 in the communication apparatus 300 and, further, the user's selected image data is transferred to the telephone network by using the communication apparatus 300.

First, the communication system control circuit 350 in the communication apparatus 300 refers to the residual amount of the battery of the power supply 386 via the power control means 380 (step S901), and transmits the referred residual amount of the battery to the image pickup apparatus 100 via the communication means 330 and the antenna 332 (step S902).

When the antenna 112 and the communication means 110 in the image pickup apparatus 100 receive the transmitted residual amount of the battery, the system control circuit 50 in the image pickup apparatus 100 determines the received residual amount of the battery (step S903). Incidentally, the determination of the residual amount of the battery is based on comparison with reference values G1 and G2 (G1<G2). Assuming that reference symbol G denotes the residual amount of the battery, if G<G1, it is determined that G is small; if G1≦G≦G2, it is determined that G is medium; and, if G2<G, it is determined that G is large.

If the determined result of the residual amount of the battery (G) is small in step S903, the system control circuit 50 extracts only a thumbnail image in the head of the JPEG file, including the selected image data, from the memory 30 in response to the user operating of the communication apparatus 300 (step S904). Further, the system control circuit 50 sets the extracted thumbnail as image data for transfer and, after that, the processing routine advances to step S908.

If the determined result of the residual amount of the battery (G) is medium in step S903, the system control circuit 50 extracts the JPEG file in a raw state, including the selected image data, from the memory 30 in response to the user operating the communication apparatus 300 (step S905). Thereafter, the extracted JPEG file is compressed under the control of the compressing/decompressing circuit 32 by the memory control circuit 22 (step S906). Further, the compressed JPEG file is set as the image data for transfer and, after that, the processing routine advances to step S908.

If the determined result of the residual amount of the battery (G) is large in step S903, the system control circuit 50 extracts the JPEG file in a raw state, including the selected image data, from the memory 30 in response to the user operating the communication apparatus 300 (step S907). Further, the extracted JPEG file is set as the image data for transfer and, after that, the processing routine advances to step S908.

In step S908, the system control circuit 50 transmits the image data for transfer to the communication apparatus 300 via the communication means 110 and the antenna 112. When the antenna 332 and the communication means 330 in the communication apparatus 300 receive the transmitted image data for transfer, the communication system control circuit 350 in the communication apparatus 300 transfers the received image data for transfer to the telephone network via the communication means 326 and the antenna 328 (step S909). Thereafter, this process ends.

In the image-data-size changing process in FIG. 9, since the system control circuit 50 in the image pickup apparatus 100 and the communication system control circuit 350 in the communication apparatus 300 transfer the thumbnail of the selected image data to the telephone network when the residual amount of the battery of the power supply 386 is small, the data size can be reduced and a communication time of the image can also be reduced. As a result, even if decreasing the residual amount of the battery of the portable radio communication apparatus, it is possible to prevent rapid deterioration in the battery and an erroneous operation of the circuit due to the decrease in the circuit voltage.

If the image size communicated with image pickup apparatus 100 in the case of the residual amount of the battery referred in step S901 (e.g., the thumbnail, the image obtained by further compressing the JPEG file, or the JPEG image) is displayed and the user accepts the communication of the displayed image size by operating the operating means 362, the processing routine after step S602 may be performed. As a result, the image having the size accepted by the user is communicated.

Any desired storage medium for storing a program to execute the processes in FIGS. 6 to 9 may supply the program to the image pickup apparatus 100 and the communication apparatus 300, and it is sufficient to execute the program by any one of the system control circuit 50 in the image pickup apparatus 100, the communication system control circuit in the communication apparatus 300, and a CPU, an MPU, and a computer in the image pickup apparatus 100 and the communication apparatus 300 (which are not shown). The storage medium for supplying the program may be, for example, a floppy disk, a hard disk, an optical disk, an optical magnetic disk, a CD-ROM, an MO, a CD-R, a magnetic tape, a nonvolatile memory card, a ROM, or the like.

In place of one of the system control circuit 50, the communication system control circuit 350, the computer, the CPU, and the MPU, a circuit for operating in a manner similar to the foregoing may embody the above embodiments.

As mentioned above, according to the present invention, since the capacity of the image transmitted to the communication apparatus is changed based on the communication mode of the public communication network, it is possible to prevent long-time exclusive use (unnecessary use) of a specific frequency or a specific channel and to prevent an increase in power (battery) consumption even if the line quality of the public communication network is low or the data transfer capacity is small.

Since the capacity of the image transmitted to the communication apparatus is changed based on the power supply state of the power supply means in the communication apparatus, the communication time of the image can be reduced. Consequently, even in the case of the decrease in the residual amount of the battery in the portable radio communication apparatus, the rapid deterioration in the battery and the erroneous operation of the circuit due to the decreased in the voltage of the circuit can be prevented.

As mentioned above, the image having the best capacity can be transferred to the communication apparatus from the image pickup apparatus in accordance with the status of the communication apparatus.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
    a communication unit for communicating with an external communication apparatus that communicates with a base station by a first communication method and which communicates with a communication terminal different from the base station by a second communication method, wherein said communication unit communicates with the external communication apparatus by the second communication method; and
    a changing unit for changing a size of an image file transmitted to the external communication apparatus by the second communication method, in accordance with information which is informed from the external communication apparatus by the second communication method and which is related to communication of the external communication apparatus with the base station by the first communication method.

2. An image processing apparatus according to claim 1, wherein the information indicates a received signal strength of a signal for the communication of the external communication apparatus with the base station by the first communication method.

3. An image processing apparatus according to claim 1, wherein the information indicates an error rate of a signal for the communication of the external communication apparatus with the base station by the first communication method.

4. An image processing apparatus according to claim 1, wherein the information indicates a data transfer capacity for the communication of the external communication apparatus with the base station by the first communication method.

5. An image processing apparatus according to claim 4, wherein the data transfer capacity is a data capacity in a service which is provided by a communication carrier.

6. An image processing apparatus according to claim 1, wherein said changing unit changes the size of the image file in response to instructions from the external communication apparatus.

7. A communication apparatus comprising:
  a first communication unit for communicating with a base station by a first communication method;
  a second communication unit for communicating with an external image processing apparatus different from the base station by a second communication method; and
  a control unit for informing said external image processing apparatus of information which is related to the communication of said first communication unit with the base station by the first communication method, wherein said control unit informs said external image processing apparatus of the information by the second communication method so as to change a size of an image file transmitted to said communication apparatus by the external image processing apparatus.

8. A communication apparatus according to claim 7, wherein the information indicates a received signal strength of a signal for the communication of the first communication unit with the base station by the first communication method.

9. A communication apparatus according to claim 7, wherein the information indicates an error rate of a signal for the communication of the first communication unit with the base station by the first communication method.

10. A communication apparatus according to claim 7, wherein the information indicates a data transfer capacity for the communication of the first communication unit with the base station by the first communication method.

11. A communication apparatus according to claim 10, wherein the data transfer capacity is a data capacity in a service which is provided by a communication carrier.

12. A control method of an image processing apparatus, comprising:
  a communication step of communicating with an external communication apparatus that communicates with a base station by a first communication method and which communicates with a communication terminal different from the base station by a second communication method, wherein said communication step comprises receipt of information from the external communication apparatus by the second communication method, wherein the information is related to communication of the external communication apparatus with the base station by the first communication method; and
  a changing step of changing a size of an image file transmitted to the external communication apparatus by the second communication method, in accordance with the information that is received from the external communication apparatus.

13. A control method of a communication apparatus, comprising:
  a first communication step of communicating with a base station by a first communication method;
  a second communication step of communicating with an external image processing apparatus different from the base station by a second communication method; and
  a control step of informing said external image processing apparatus of information which is related to communication with the base station by the first communication method at said first communication step, wherein said control step informs said external image processing apparatus of the information by the second communication method so as to change a size of an image file transmitted to said communication apparatus by the external image processing apparatus.

14. A storage medium for storing a program to control an image processing apparatus, wherein said program comprises:
  a communication step of communicating with an external communication apparatus that communicates with a base station by a first communication method and which communication with a communication terminal different from the base station by a second communication method, wherein said communication step comprises receipt of information from the external communication apparatus by the second communication method, wherein the information is related to communication of the external communication apparatus with the base station by the first communication method; and
  a changing step of changing a size of an image file transmitted to the external communication apparatus by the second communication method, in accordance with the information that is received from the external communication apparatus.

15. A storage medium for storing a program to control a communication, wherein said program comprises:
  a first communication step of communicating with a base station by a first communication method;
  a second communication step of communicating with an external image processing apparatus different from the base station by a second communication method; and
  a control step of informing said external image processing apparatus of information which is related to the communication with the base station by the first communication method at said first communication step, wherein said control step informs said external image processing apparatus of the information by the second communication method so as to change a size of an image file transmitted to the communication apparatus by the external image processing apparatus.

* * * * *

UNITED STATES PATENT AND TRADEMARK OFFICE
CERTIFICATE OF CORRECTION

| | | |
|---|---|---|
| PATENT NO. | : 7,095,982 B2 | Page 1 of 1 |
| APPLICATION NO. | : 09/956092 | |
| DATED | : August 22, 2006 | |
| INVENTOR(S) | : Koichi Mizutani | |

It is certified that error appears in the above-identified patent and that said Letters Patent is hereby corrected as shown below:

COVER PAGE:
(56) References Cited FOREIGN PATENT DOCUMENTS:
"410304445 A" should read -- 10-304445 --.

Signed and Sealed this

Twenty-fourth Day of July, 2007

JON W. DUDAS
*Director of the United States Patent and Trademark Office*